US010836171B2

(12) United States Patent
Sagara et al.

(10) Patent No.: US 10,836,171 B2
(45) Date of Patent: Nov. 17, 2020

(54) INK AND CLEANING LIQUID SET, INKJET PRINTING DEVICE, INKJET PRINTING METHOD, AND METHOD OF CLEANING NOZZLE SURFACE OF INKJET DISCHARGING HEAD

(71) Applicants: Amika Sagara, Kanagawa (JP); Yuuki Yokohama, Kanagawa (JP); Masaki Kudo, Kanagawa (JP); Yuusuke Koizuka, Kanagawa (JP); Akihiko Matsuyama, Shizuoka (JP); Koichiro Oyama, Kanagawa (JP)

(72) Inventors: Amika Sagara, Kanagawa (JP); Yuuki Yokohama, Kanagawa (JP); Masaki Kudo, Kanagawa (JP); Yuusuke Koizuka, Kanagawa (JP); Akihiko Matsuyama, Shizuoka (JP); Koichiro Oyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/507,069

(22) Filed: Jul. 10, 2019

(65) Prior Publication Data
US 2020/0016898 A1 Jan. 16, 2020

(30) Foreign Application Priority Data

Jul. 13, 2018 (JP) .................................. 2018-132891
Jan. 7, 2019 (JP) .................................. 2019-000462

(51) Int. Cl.
*B41J 2/165* (2006.01)
*C09D 11/037* (2014.01)
(Continued)

(52) U.S. Cl.
CPC ....... *B41J 2/16535* (2013.01); *B41J 2/16552* (2013.01); *C09D 11/037* (2013.01);
(Continued)

(58) Field of Classification Search
CPC ................ B41J 2/16535; B41J 2/16538; B41J 2/16541; B41J 2/16544; B41J 2/16547;
(Continued)

(56) References Cited

U.S. PATENT DOCUMENTS

| 2011/0037805 A1 | 2/2011 | Arai et al. |
| 2013/0070036 A1 | 3/2013 | Ooishi |

(Continued)

FOREIGN PATENT DOCUMENTS

| EP | 2 853 568 A1 | 4/2015 |
| JP | 2014-108521 | 6/2014 |

(Continued)

OTHER PUBLICATIONS

Extended European Search Report dated Nov. 20, 2019 in European Patent Application No. 19184112.1, 6 pages.

*Primary Examiner* — Kristal Feggins
(74) *Attorney, Agent, or Firm* — Oblon, McClelland, Maier & Neustadt, L.L.P.

(57) ABSTRACT

An ink and cleaning liquid set includes an ink comprising a coloring material and a resin and a cleaning liquid comprising water and at least one type of organic solvent, wherein the ink in a dried form has a glass transition temperature of from 40 to 90 degrees C. and the swelling ratio calculated from a mass of a film of the ink in a dried form before and after immersion in the cleaning liquid is 10 percent or greater according to the following relationship 1: swelling ratio (percent)=100×[(B−A)/A] Relationship 1, where A represents the mass of the film before the immersion and B represents the mass of the film after the immersion.

10 Claims, 2 Drawing Sheets

(51) Int. Cl.
   *C09D 11/107*   (2014.01)
   *C09D 11/322*   (2014.01)
   *C11D 3/20*     (2006.01)
   *C11D 3/32*     (2006.01)
   *C11D 11/00*    (2006.01)

(52) U.S. Cl.
   CPC .......... *C09D 11/107* (2013.01); *C09D 11/322* (2013.01); *C11D 3/2044* (2013.01); *C11D 3/2068* (2013.01); *C11D 3/32* (2013.01); *C11D 11/0047* (2013.01)

(58) Field of Classification Search
   CPC ...... B41J 2002/1655; B41J 2002/16558; B41J 2/16552; C09D 11/322; C09D 11/40; C09D 11/10
   See application file for complete search history.

(56) References Cited

U.S. PATENT DOCUMENTS

| | | |
|---|---|---|
| 2013/0307899 A1 | 11/2013 | Saito et al. |
| 2014/0240393 A1 | 8/2014 | Mukai et al. |
| 2015/0091973 A1 | 4/2015 | Ikoshi et al. |
| 2017/0114236 A1 | 4/2017 | Sagara et al. |
| 2017/0183528 A1 | 6/2017 | Kohzuki et al. |
| 2017/0267879 A1 | 9/2017 | Kohzuki et al. |

FOREIGN PATENT DOCUMENTS

| | | |
|---|---|---|
| JP | 2017-114951 | 6/2017 |
| JP | 2017-119828 | 7/2017 |
| WO | WO 2018/079513 A1 | 5/2018 |

INK AND CLEANING LIQUID SET, INKJET PRINTING DEVICE, INKJET PRINTING METHOD, AND METHOD OF CLEANING NOZZLE SURFACE OF INKJET DISCHARGING HEAD

CROSS-REFERENCE TO RELATED APPLICATIONS

This patent application is based on and claims priority pursuant to 35 U.S.C. § 119 to Japanese Patent Application Nos. 2018-132891 and 2019-000462, filed on Jul. 13, 2018 and Jan. 7, 2019, respectively, in the Japan Patent Office, the entire disclosures of which are hereby incorporated by reference herein.

BACKGROUND

Technical Field

The present invention relates to an ink and cleaning liquid set, an inkjet printing device, an inkjet printing method, and a method of cleaning a nozzle surface of an inkjet discharging head.

Description of the Related Art

As inkjet ink, dye ink has been the mainstream in terms of coloring and reliability. However, at the same time, such a dye ink has disadvantages about water-resistance, light resistance, etc. For this reason, pigment ink has become popular as a substitute.

Such pigment ink adheres to a recording head and agglomerates and dries thereon during continuous recording, which may degrade discharging stability of the pigment ink. Therefore, it is necessary to remove the ink adhering to the recording head, etc., in order to secure discharging stability of the pigment ink. However, conventional cleaning liquid does not suffice when the pigment ink firmly adheres to the recording head, etc.

In addition, to meet needs of high productivity in the fields of commercial printing and industrial printing, images must be formed and dried at such a high speed as several tens meter per minute. Therefore, devices have been researched in many ways to efficiently and quickly dry printed matter.

For this reason, an ink containing a resin particle having a high glass transition temperature (Tg) has been proposed as an ink capable of increasing productivity in, for example, JP-2017-114951-A.

In addition, a set of an ink containing water and a resin and a cleaning liquid containing water and an organic solvent has been proposed in, for example, JP-2017-119828-A.

SUMMARY

According to embodiments of the present disclosure, provided is an ink and cleaning liquid set which includes an ink containing a coloring material and a resin and a cleaning liquid containing water and at least one type of organic solvent, wherein the ink in a dried form has a glass transition temperature of from 40 to 90 degrees C. and the swelling ratio calculated from the mass of a film of the ink in a dried form before and after immersion in the cleaning liquid is 10 percent or greater according to the following relationship 1: the swelling ratio (percent)=$100\times[(B-A)/A]$ Relationship 1, where A represents the mass of the film before the immersion and B represents the mass of the film after the immersion.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
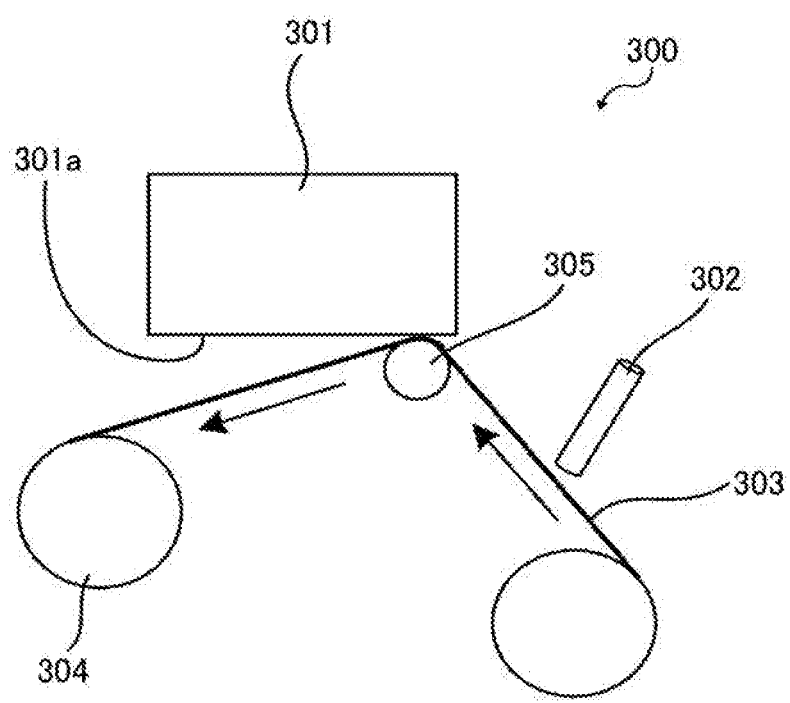
FIG. 1 is a schematic diagram illustrating an example of a cleaning device for use in the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to embodiments of the present disclosure, an ink and cleaning liquid set is provided which demonstrates excellent cleaning property for ink containing a resin having a high glass transition temperature capable of enhancing productivity.

Ink and Cleaning Liquid Set

The ink and cleaning liquid set of the present disclosure contains an ink containing a coloring material and a resin and a cleaning liquid containing water and an organic solvent. The glass transition temperature of the ink in a dried form is from 40 to 90 degrees C. Also, the swelling ratio of the mass of a film of the ink in a dried form before and after immersion in the cleaning liquid is 10 percent or greater according to the following relationship 1:

Swelling ratio (percent)=100×[(B−A)/A]   Relationship 1

In Relationship 1, A represents the mass of the film of the ink before immersion and B represents the mass of the film of the ink after immersion.

The set of the ink and the cleaning liquid according to the present disclosure is based on the knowledge that, in typical technologies, attention has not been paid to the relationship between the ink capable of achieving high productivity and the cleaning liquid used to wipe off the ink, and it is not considered that the cleaning liquid does not suffice to remove the ink when it easily dries and adheres to a recording head, a flow path, etc., which causes a maintenance problem.

The set of the present disclosure has a combination of an ink and a cleaning liquid suitable to swell the ink in a dried form which adheres to a recording head, etc., thereby demonstrating an excellent power of the cleaning liquid removing the ink even containing a resin having a high glass transition temperature which is capable of increasing productivity.

Inclusion of a resin having a high glass transition temperature in the ink enhances the power of adhesion between pigments in the ink in a dried form or the pigments and a recording medium, so that the ink demonstrates an excellent abrasion resistance.

The glass transition temperature (Tg) of the ink in the dried form is from 40 to 90 degrees C. and preferably from 65 to 85 degrees C. Tackiness of the ink layer in an image form is reduced so that the ink layer can be prevented from being peeled off due to contact with an internal member of the device immediately after drying or adhesion between adjacent images, thereby obtaining an ink suitable for high productivity.

The glass transition temperature (Tg) of the ink in the dried form can be measured as follows.

Measurement of Glass Transition Temperature (Tg) of Ink in Dried Form 5 g of ink is dripped onto a Teflon® petri dish having a diameter of 4 cm and dried at 50 degrees C. for 72 hours to obtain a dried solid ink.

The thus-obtained dried solid ink is measured using a differential scanning calorimeter (Thermo plus EVO2 DSC8231, manufactured by Rigaku Corporation) to calculate the glass transition temperature (Tg).

Furthermore, in order to realize high productivity, the glass transition temperature (Tg) of the resin in the ink is preferably 60 degrees or higher and more preferably 100 degrees C. or lower.

Based on the mass of the ink film obtained by drying the ink between before and after immersing the ink film in the cleaning liquid, the swelling ratio which is calculated according to the following relationship 1 is 10 percent or more, preferably 14 percent or more, and more preferably from 30 to 150 percent. When the swelling ratio is 10 percent or more, the organic solvent in the cleaning liquid swells the resin and the pigment in the ink to the ink in the dried form, so that the ink in the dried form is softened and easily removed by wiping, etc., thereby demonstrating excellent cleanability.

Swelling ratio (percent)=100×[(B−A)/A]   Relationship 1

In Relationship 1, A represents the mass of the ink film before immersion and B represents the mass of the ink film after the immersion.

The swelling ratio of the ink film in the cleaning liquid can be obtained as follows.

5 g of ink is dripped onto a Teflon® petri dish having a diameter of 4 cm and dried at 50 degrees C. for 72 hours to obtain a dried solid matter of ink film.

The thus-obtained dried solid matter of the ink film is cut into 1 cm square to measure the mass. The cut ink film is immersed in a sufficient amount of the cleaning liquid, allowed to rest at normal temperature (25 degrees C.) for three minutes, taken out from the cleaning liquid, and wiped by KimWipes (manufactured by NIPPON PAPER CRECIA Co., LTD.) to a degree that the cleaning liquid adhering to the surface is not visible. Thereafter, the mass of the cut ink film is measured and the swelling ratio is calculated according to Relationship 1.

Ink

The organic solvent, water, coloring material, resins, and additives for use in the ink are described below.

Organic Solvent

There is no specific limitation on the type of the organic solvent used in the present disclosure. For example, water-soluble organic solvents are suitable. Examples are polyhydric alcohols, ethers such as polyhydric alcohol alkylethers and polyhydric alcohol arylethers, nitrogen-containing heterocyclic compounds, amides, amines, sulfur-containing compounds, etc.

Specific examples of the polyhydric alcohol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1, 2,4-butanetriol, 1,2,3-butanetriol, 2,2,4-trimethyl-1,3-pentanediol, and petriol.

Specific examples of the polyol alkylethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyhydric alcohol arylethers include, but are not limited to, ethylene glycol monophenylether and ethylene glycol monobenzylether.

Specific examples of nitrogen-containing heterocyclic compounds include, but are not limited to, 2-pyrolidone, N-methyl-2-pyrolidone, N-hydroxyethyl-2-pyrolidone, 1,3-dimethyl-2-imidazoline, ε-caprolactam, and γ-butyrolactone.

Specific examples of the amide include, but are not limited to, formamide, N-methyl formamide, N,N-dimethylformamide, 3-methoxy-N,N-dimethyl propionamide, and 3-butoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate and ethylene carbonate can be used as the organic solvent.

To serve as a humectant and impart a good drying property, it is preferable to use an organic solvent having a boiling point of 250 degrees C. or lower.

Polyhydric alcohol compounds having eight or more carbon atoms and glycol ether compounds are also suitable as the organic solvent.

Specific examples of the polyhydric alcohol compound having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethyleneglycol monoethylether, ethyleneglycol monobutylether, diethyleneglycol monomethylether, diethyleneglycol mono ethyl ether, diethyleneglycol monobutylether, tetraethyleneglycol monomethylether, and propyleneglycol monoethylether; and polyhydric alcohol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Coloring Material

The coloring material has no particular limit. For example, pigments and dyes are usable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on the type of a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density.

The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc., to remove coarse particles followed by degassing.

Resin

The type of the resin contained in the ink has no particular limit and can be suitably selected to suit to a particular application as long as it is contained as a fixing resin in the ink. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, acrylic silicone-based resins, etc.

The resin in the ink is preferably contained as a form of resin particles. It is possible to mix a resin emulsion in which such resin particles are dispersed in water as a dispersion medium with materials such as a coloring material and an organic solvent to obtain an ink. It is possible to use suitably-synthesized resin particulate as the resin particle. Alternatively, the resin particulate available on the market can be used. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness. Furthermore, in order to fulfill the function of a dispersion helping agent to the carbon black pigment dispersion, the volume average particle diameter is more preferably from 20 to 45 nm.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of ink, it is preferably from 1 to 30 percent by mass and more preferably from 5 to 20 percent by mass to the total amount of the ink.

In the present disclosure, in order to improve the blocking resistance, it is preferable to use an acrylic resin. The proportion of the acrylic resin in the ink is preferably from 3 percent by mass or more and more preferably 7 percent by mass or more. When the proportion of the acrylic resin in the ink is 3 percent by mass or more, the blocking resistance is further improved, which is preferable.

The particle diameter of the solid portion in the ink has no particular limit and can be selected to suit to a particular application. The maximum frequency of the particle diameter of the solid portion in the ink is preferably from 20 to 1,000 nm and more preferably from 20 to 150 nm in the maximum number conversion to enhance discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Additive

The ink may furthermore optionally contain additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluoro-surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane.

In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Torray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

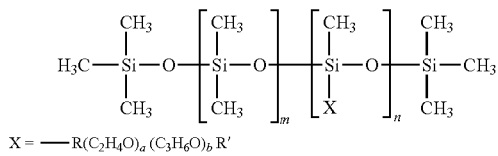

Chemical formula S-1

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

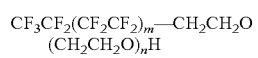

Chemical formula F-1

In the compound represented by Chemical formula F-1, m is preferably 0 or an integer of from 1 to 10 and is preferably 0 or an integer of from 1 to 40.

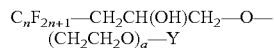

Chemical formula F-2

In the compound represented by the chemical formula F-2, Y represents H or $C_mF_{2m+1}$, where m represents an integer of from 1 to 6, or $CH_2CH(OH)CH_2$—$C_mF_{2m+1}$, wherein represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used. Specific examples of the products available on the market include, but are not limited to, SURFLON S-111, SURFLON S-112, SURFLON S-113, SURFLON Ss-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, PSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (Manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, in particular coloring, and improvement on permeation to paper, wettability, and uniform dying property.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7.

Specific examples include, but are not limited to, amines such as diethanol amine and triethanol amine.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Pre-Processing Liquid

The pre-processing liquid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing liquid can be used.

The type of the flocculant is not particularly limited. For example, water-soluble cationic polymers, acids, and multivalent metal salts are suitable.

Post-Processing Liquid

The post-processing liquid has no particular limit. It is preferable that the post-processing liquid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing liquid. The post-processing liquid can be applied to the entire recording area formed on a recording medium or only the area on which an ink image is formed.

Recording Medium

The recording medium for use in recording is not particularly limited. Specific examples include, but are not limited to, plain paper, gloss paper, special paper, cloth, film, transparent sheets, and printing paper for general purposes.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The ink recorded matter of the present disclosure includes a recording medium and an image formed on the recording medium with the ink and cleaning liquid set of the present disclosure.

The recorded matter is obtained by an inkjet recording device executing an inkjet recording method.

Cleaning Liquid

The cleaning liquid contains water and an organic solvent and other optional components.

Organic Solvent

The organic solvent in the cleaning liquid preferably contains an organic solvent having a hydrogen bond term of 4.5 or less of the solubility parameter (HSP) of Hansen in an amount of 10 percent by mass or more and more preferably from 15 to 40 percent by mass. Inclusion of a large amount of the organic solvent having a low HSP value makes the ink in a dry state swelling more easily.

Specific examples of the organic solvents having a hydrogen bonding term of 4.5 or less of the solubility parameter (HSP) of Hansen include, but are not limited to, diethylene glycol diethyl ether ($\delta H$ of HSP: 2.73 $(cal/cm^3)^{1/2}$), 2-pyrrolidone (HSP $\delta H$: 4.39 $(cal/cm^3)^{1/2}$, propylene glycol monobutyl ether (HSP $\delta H$: 4.48 $(cal/cm^3)^{1/2}$), diethylene glycol monobutyl ether (HSP $\delta H$: 2.14 $(cal/cm^3)^{1/2}$, and propylene glycol monopropyl ether (HSP $\delta H$: 4.48 $(cal/cm^3)^{1/2}$.

Hydrogen Bond Term of Hansen Solubility Parameter

The hydrogen bond terms (hereinafter also referred to as $\delta H$) of the Hansen solubility parameter (hereinafter also referred to as HSP) of the organic solvent is 7.0 $(cal/cm^3)^{1/2}$ or less and preferably from 5.0 to 6.8 $(cal/cm^3)^{1/2}$. When the hydrogen bond term of the Hansen solubility parameter is 7.0 $(cal/cm^3)^{1/2}$ or less, cleaning power can be improved, thereby demonstrating more excellent discharging stability.

The Hansen solubility parameter (HSP) is what is represented in a three dimensional space using three components of dispersion term ($\delta D$), polarity term ($\delta$), and hydrogen bond term ($\delta H$), which are obtained by dividing the solubility parameter (SP) introduced by Hildebrand. The dispersion term ($\delta D$) is based on proximity force of Van Der Waals. The polarity ($\delta P$) is also referred to as polarization term and based on dipole moment and dielectric constant. The hydrogen bond term ($\delta H$) includes an intermolecular force based on hydrogen bond and furthermore other unclassifiable factors such as $\pi$-$\pi$ interaction. In the present disclosure, the hydrogen bond term ($\delta H$) is used.

The three components of the dispersion term ($\delta D$), the polarity term ($\delta$), and the hydrogen bond term ($\delta H$) have been obtained by Hansen and his successors. The details are described in Polymer Handbook (fourth edition), VII-698 to 711. The definition and calculation of HSP are described in the following document. Hansen Solubility Parameters: A Users Hand book (authored by Charles M. Hansen, published by CRC Press in 2007).

Hansen solubility parameters of many solvents and resins have been obtained, which are described in, for example, Industrial Solvents Handbook, authored by Wesley L. Archer.

The organic solvent is not particularly limited as long as the hydrogen bonding term of the Hansen solubility parameter can be adjusted, and can be suitably selected to suit to a particular application. Water-soluble organic solvents are preferable. Note that being water-soluble means, for example, 5 g or more of an organic solvent is dissolved in 100 g of water at 25 degrees C.

Examples of the water-soluble organic solvent include ethers such as polyhydric alcohols, polyhydric alcohol alkyl ethers, and polyhydric alcohol aryl ethers, nitrogen-containing heterocyclic compounds, amides, amines, sulfur-containing compounds, propylene carbonates (HSP $\delta H$: 2.00 $(cal/cm^3)^{1/2}$), and ethylene carbonate (HSP $\delta H$: 2.49 $(cal/cm^3)^{1/2}$.

Specific examples of the polyhydric alcohol include, but are not limited to, ethylene glycol ($\delta H$ of HSP: 12.7 $(cal/cm^3)^{1/2}$), diethylene glycol (HSP $\delta H$: 9.27 $(cal/cm^3)^{1/2}$), 1,2-propanediol (HSP $\delta H$: 3.31 $(cal/cm^3)^{1/2}$), 1,3-propanediol (HSP $\delta H$: 11.3 $(cal/cm)^3)^{1/2}$, specific gravity: 1.005), 1,2-butanediol (HSP $\delta H$: 10.2 $(cal/cm)^3)^{1/2}$, specific gravity: 1.002), 1,3-butanediol (HSP $\delta H$: 9.37 $(cal/cm^3)^{1/2}$, specific gravity: 1.005), 1,4-butanediol (HSP $\delta H$: 10.2 $(cal/cm)^3)^{1/2}$) 3-methyl-1,3-butanediol (HSP $\delta H$: 8.19 $(cal/cm^3)^{1/2}$), 2,3-butanediol (HSP $\delta H$: 8.19 $(cal/cm^3)^{1/2}$), triethylene glycol (HSP $\delta H$: 9.07 $(cal/cm^3)^{1/2}$), 1,5-pentanediol (HSP $\delta H$: 9.65 $(cal/cm^3)^{1/2}$), 1,6-hexanediol (HSP $\delta H$: 8.68 $(cal/cm^3)^{1/2}$), glycerin (HSP $\delta H$: 13.3 $(cal/cm)^3)^{1/2}$), 3-methoxy-3-methyl-1-butanol (HSP $\delta H$: 6.29 $(cal/cm^3)^{1/2}$, specific gravity: 0.927), and 3-ethyl-3-oxetane methanol (HSP $\delta H$: 6.05 $(cal/cm^3)^{1/2}$, specific gravity: 1.019). These can be used alone or in combination.

Specific examples of the polyhydric alcohol alkyl ethers include, but are not limited to, ethylene glycol monoethyl ether ($\delta H$ of HSP: 6.83 $(cal/cm^3)^{1/2}$), ethylene glycol monobutyl ether (HSP $\delta H$: 6.00 $(cal/cm^3)^{1/2}$), diethylene glycol monomethyl ether (HSP $\delta H$: 6.14 $(cal/cm)^3)^{1/2}$), diethylene glycol monoethyl ether (HSP $\delta H$: 5.95 $(cal/cm^3)^{1/2}$), diethylene glycol diethyl ether (HSP $\delta H$: 2.73 $(cal/cm^3)^{1/2}$), diethylene glycol monobutyl ether (HSP $\delta H$: 5.17 $(cal/cm^3)^{1/2}$, propylene glycol monoethyl ether (HSP $\delta H$: 5.12 $(cal/cm^3)^{1/2}$), propylene glycol monopropyl ether (HSP $\delta H$: 4.48 $(cal/cm^3)^{1/2}$, propylene glycol monobutyl ether (HSP $\delta H$: 4.48 $(cal/cm^3)^{1/2}$, propylene glycol monoisobutyl ether (HSP $\delta H$: 4.78 $(cal/cm^3)^{1/2}$), diethylene glycol dibutyl ether (HSP $\delta H$: 2.14 $(cal/cm^3)^{1/2}$), and dipropylene glycol mono-n-butyl ether (HSP $\delta H$: 4.87 $(cal/cm^3)^{1/2}$. These can be used alone or in combination.

Specific examples of the polyhydric alcohol arylethers include, but are not limited to, ethylene glycol monophenylether and ethylene glycol monobenzylether.

Specific examples of the nitrogen-containing heterocyclic compound include, but are not limited to, 2-pyrrolidone ($\delta H$ of HSP: 4.39 $(cal/cm^3)^{1/2}$, specific gravity: 1.1), N-methyl-2-pyrrolidone ($\delta H$ of HSP: 3.51 $(cal/cm^3)^{1/2}$), and $\varepsilon$-caprolactam ($\delta H$ of HSP: 1.90 $(cal/cm^3)^{1/2}$. These can be used alone or in combination.

Specific examples of the amide include, but are not limited to, formamide ($\delta H$ of HSP: 9.27 $(cal/cm^3)^{1/2}$), N-methyl formamide ($\delta H$ of HSP: 7.76 $(cal/cm^3)^{1/2}$), and N,N-dimethylformamide (HSP $\delta H$: 5.51 $(cal/cm^3)^{1/2}$. These can be used alone or in combination.

Specific examples of the amines include, but are not limited to, monoethanolamine ($\delta H$ of HSP: 10.2 $(cal/cm^3)^{1/2}$) and diethanolamine (HSP $\delta H$: 9.67 $(cal/cm)^3)^{1/2}$. These can be used alone or in combination.

Specific examples of the sulfur-containing compounds include, but are not limited to, dimethyl sulfoxide ($\delta H$ of HSP: 4.98 $(cal/cm^3)^{1/2}$) and sulfolane (HSP $\delta H$: 4.24 $(cal/cm^3)^{1/2}$. These can be used alone or in combination.

Of these, solvents having a hydrogen bonding term of 5 $(cal/cm^3)^{1/2}$ or less of the Hansen solubility parameter are preferable. More preferred are, for example, dipropylene glycol mono n-butyl ether ($\delta H$ of HSP: 4.87 $(cal/cm^3)^{1/2}$), 2-pyrrolidone (HSP $\delta H$: 4.39 $(cal/cm^3)^{1/2}$), diethylene glycol diethyl ether (HSP $\delta H$: 2.73 $(cal/cm^3)^{1/2}$, propylene glycol monobutyl ether (HSP $\delta H$: 4.48 $(cal/cm^3)^{1/2}$), diethylene glycol dibutyl ether (HSP $\delta H$: 2.14 $(cal/cm^3)^{1/2}$), propylene glycol monoisobutyl ether (HSP $\delta H$: 4.78 $(cal/cm^3)^{1/2}$, propylene glycol monopropyl ether (HSP $\delta H$: 4.48 $(cal/cm^3)^{1/2}$, the compound represented by the following Chemical formula (1) (where $R^1$ represents a methyl group, $\delta H$: 4.63 $(cal/cm^3)^{1/2}$, specific gravity: 0.99), the compound represented by the following Chemical formula (1) (where $R^1$ represents an ethyl group, $\delta H$: 3.65 $(cal/cm^3)^{1/2}$, specific gravity: 0.97), and the compound represented by the following Chemical formula (1) (where $R^1$ represents a butyl group, $\delta H$: 3.26 $(cal/cm^3)^{1/2}$.

Particularly preferred are, for example, the compound represented by the following Chemical formula (1) (where $R^1$ represents a methyl group, $\delta H$: 4.63 $(cal/cm^3)^{1/2}$ and the compound represented by the following Chemical formula (1) (where $R^1$ represents an ethyl group, $\delta H$: 3.65 $(cal/cm^3)^{1/2}$.

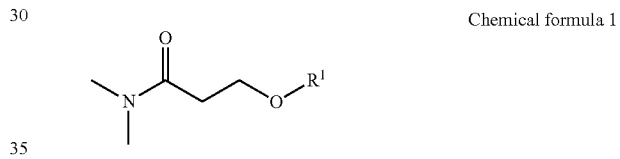

Chemical formula 1

In Chemical formula 1, $R^1$ represents an alkyl group having 1 to 4 carbon atoms.

The HSP value (hydrogen bonding term of Hansen solubility parameter) of the organic solvent can also be determined using software HSPiP of Charles M. Hansen Consulting (Horsholm, Denmark, hansen-solubility.com). The following describes how to determine the hydrogen bonding term of the Hansen solubility parameter of a solvent having an unknown hydrogen bonding term of the Hansen solubility parameter using HSPiP software.

The hydrogen bonding term of the Hansen solubility parameter can be obtained using HSPiP version 4.1 software available at http://www.pirika.com/ as of October 2015.

The hydrogen bonding term of the Hansen solubility parameter of the solvent can be determined from the chemical structure (main chain, functional group) using the modified SMILES notation and the HSP prediction tool in HSPiP. In the present disclosure, these values are used for solvents (refer to various HSP documents) registered in the database of HSPiP version 3.0.38 and the values anticipated by the HSPiP are used for solvents not registered in the database.

The proportion of the organic solvent to the total amount of the cleaning liquid is preferably from 60 percent by mass or more and more preferably from 70 to 80 percent by mass.

Water

There is no specific limitation to the water and it can be suitably selected to suit to a particular application. For example, pure water and ultra pure water such as deionized water, ultrafiltered water, reverse osmosis water, and distilled water are suitable. These can be used alone or in combination.

The proportion of the water is not particularly limited and can be suitably selected to suit to a particular application. For example, it is preferably from 10 to 30 percent by mass and more preferably from 10 to 20 percent by mass to the total amount of the cleaning liquid.

Other Components

Examples of the other component are surfactants, defoaming agents, preservatives and fungicides, corrosion inhibitors, and pH regulators.

Surfactant

The surfactant is not particularly limited and can be suitably selected to suit to a particular application. For example, a fluorochemical surfactant is preferable and 2-perfluoroalkylethanol is more preferable.

Any suitably synthesized surfactant and products available on the market are also usable. A specific example of the commercially available product is Zonyl™ FSO-100 (manufactured by E.I. du Pont de Nemours and Company).

Defoaming Agent

There is no specific limitation to the chelate agent and it can be suitably selected to suit to a particular application. A specific example is 2,4,7,9-tetramethyl-4,7-decane diol.

Cleaning Method and Cleaning Device

According to an embodiment of the cleaning method of the present disclosure, a nozzle surface of an ink discharging head is cleaned. The method includes applying a cleaning liquid to a wiping member (hereinafter also referred to as cleaning liquid application step), wiping the nozzle surface with the wiping member to which the cleaning liquid has been applied (hereinafter also referred to as wiping step), and other optional steps.

In another embodiment of the cleaning method of the present disclosure, a nozzle surface of an ink discharging head is cleaned by the cleaning liquid in the ink and cleaning liquid set of the present disclosure. The method includes applying the cleaning liquid to the nozzle surface (hereinafter also referred to as cleaning liquid application step), wiping the nozzle surface to which the cleaning liquid has been applied (hereinafter also referred to as wiping step) with a wiping member, and other optional steps.

The cleaning liquid mentioned above represents the cleaning liquid in the ink and cleaning liquid set of the present disclosure.

According to an embodiment of the cleaning device relating to the present disclosure, a nozzle surface of an ink discharging head is cleaned. The device includes an applying device to apply a cleaning liquid to a wiping member (hereinafter also referred to as a cleaning liquid application device), a wiping member to wipe the nozzle surface with the wiping member to which the cleaning liquid has been applied (hereinafter also referred to as a wiping device), and other optional devices.

In another embodiment of the cleaning device of the present disclosure, a nozzle surface of an ink discharging head is cleaned by the cleaning liquid in the ink and cleaning liquid set of the present disclosure. The device includes an applying device to apply the cleaning liquid to the nozzle surface (hereinafter also referred to as cleaning liquid application device), a wiping member to wipe the nozzle surface to which the cleaning liquid has been applied (hereinafter also referred to as wiping device), and other optional devices.

The cleaning liquid mentioned above represents the cleaning liquid in the ink and cleaning liquid set of the present disclosure.

Cleaning Liquid Applying Process and Cleaning Liquid Applying Device

The wiping member is normally disposed on a pressing member. Such a pressing member has no particular limit and can be suitably selected to suit to a particular application as long as it can press the nozzle surface via the wiping member. Specific examples include, but are not limited to, a pressing roller, a combination of a pressing roller and a pressing belt, a wiper, and a blade. Of these, the pressing roller is preferable.

The head and the wiping member may be brought into contact with each other by moving the head up and down or back and forth if a wipe member is fixed.

The cleaning liquid applying device has no particular limit and can be suitably selected to suit to a particular application as long as the cleaning liquid can be applied to the wiping member or the nozzle surface in a constant amount. For example, a nozzle, a spray, a dispenser, and an applicator can be used.

The removing member has no specific limit and can be suitably selected to suit to a particular application. For example, unwoven fabric and cloth can be used. Preferably, an article is rolled up in a roll-like form. Unwoven fabric having a roll-like form is preferable because it is highly reliable and does not easily produce dust.

It is preferable that the supply amount of the cleaning liquid be controlled depending on recording time. In this case, it is more preferable to select the application amount of the cleaning liquid from multiple set values. The multiple set values are, for example, pressure, number of supplies, and number of nozzles.

It is preferable to control the supply amount of the cleaning liquid by a pressure applied to a cleaning liquid applying nozzle as a cleaning liquid applying device. In addition, if the cleaning liquid is applied from multiple cleaning liquid applying nozzles, it is preferable to control the supply amount of the cleaning liquid to the wiping member or the nozzle surface by the number of the cleaning liquid applying nozzles. Moreover, it is preferable to control the supply amount of the cleaning liquid to the wiping member or the nozzle surface by the number of applying the cleaning liquid from the cleaning liquid applying nozzle.

Wiping Step and Wiping Device

In the wiping step, the nozzle surface is wiped with the wiping member to which the cleaning liquid has been applied. Alternatively, the nozzle surface to which the cleaning liquid has been applied is wiped with the wiping member. The device suitably executes the wiping step.

The method of wiping the nozzle surface with the wiping member to which the cleaning liquid has been applied has no particular limit and can be suitably selected to suit to a particular application. For example, unwoven cloth as the wiping member to which the cleaning liquid has been applied is pressed against the nozzle surface of an ink discharging head.

The method of wiping the nozzle surface to which the cleaning liquid has been applied with the wiping member has no particular limit and can be suitably selected to suit to a particular application. For example, the nozzle surface of an ink discharging head to which the cleaning liquid has been applied is wiped by unwoven cloth as the wiping member.

Other Steps and Other Devices

The other processes and the other devices include, for example, a control process and a control device.

For example, devices such as a sequencer and a computer can be used.

FIG. 1 is a schematic diagram illustrating an example of the cleaning device for an ink discharging head relating to the present disclosure. As illustrated in FIG. 1, a cleaning device 300 cleans a nozzle surface 301a on the ink discharging side of a nozzle plate 301 of an ink discharging head.

The cleaning device 300 includes an unwoven 303 as the wiping member, a cleaning liquid application nozzle 302 as the cleaning liquid application device, a pressing roller 305 as the pressing member, and a roll-up roller 304 to roll up the unwoven fabric after the wiping process.

The cleaning liquid is supplied from a cleaning liquid tank via a cleaning liquid supply tube. When driving a pump disposed in the middle of the cleaning liquid supply tube, the cleaning liquid applying nozzle 302 applies the cleaning liquid to the unwoven fabric 303 as the wiping member in an amount depending on the recording time. The non-woven fabric 303 is rolled up in a roll-like form.

As illustrated in FIG. 1, the unwoven fabric 303 to which the cleaning liquid has been applied is brought into contact with the nozzle surface 301a of the ink nozzle plate 301 under a pressure applied by the pressing roller 305 as the pressing member so that the nozzle surface 301a is cleaned. After the wiping process is complete, the non-woven fabric 303 is rolled up by the roll-up roller 304.

It is possible to provide multiple cleaning liquid application nozzles 302. A pressure can be applied thereto based on the control by a control device. The application amount of the cleaning liquid can be adjusted by suitably changing the pressure. In addition, based on the control of the control device, the number of nozzles that applies the cleaning liquid is changed to adjust the application amount of the cleaning liquid. In addition, based on the control of the control device, the number of applications of the cleaning liquid is changed to adjust the application amount of the cleaning liquid.

Inkjet Printing Device and Inkjet Printing Method

The inkjet printing device of the present disclosure includes the ink and cleaning liquid set of the present disclosure, an ink flow path, a recording head configured to discharge the ink in the ink and cleaning liquid set, and a cleaning device configured to remove the ink remaining on the ink flow path and/or the recording head with the cleaning liquid in the ink and cleaning liquid set.

The inkjet printing method of the present disclosure includes discharging the ink in the ink and cleaning liquid set of the present disclosure and removing the ink remaining on an ink flow path and/or a recording head with the cleaning liquid in the ink and cleaning liquid set.

The ink in the ink and cleaning liquid set of the present disclosure can be suitably used for various recording devices employing an inkjet recording method, such as a printer, a facsimile machine, a photocopier, a multifunction peripheral (serving as a printer, a facsimile machine, and a photocopier), and a solid freeform fabrication device (a 3D printer, an additive manufacturing device, etc.).

In the present disclosure, the recording device and the recording method respectively represent a device capable of discharging ink, various processing liquids, etc., to a recording medium and a method of recording utilizing such a device. The recording medium means an article to which ink or various processing liquids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The inkjet printing device and the inkjet printing method may further optionally include a heating device (heater) for use in a heating process and a drying device (drier) for use in a drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the inkjet printing device and the inkjet printing method are not limited to those producing meaningful visible images such as texts and figures with the ink. For example, the recording method and the recording device capable of producing patterns like geometric design and 3D images are included.

In addition, the inkjet printing device includes both a serial type device in which the discharging head is allowed to move and a line type device in which the liquid discharging head is not moved, unless otherwise specified.

Furthermore, in addition to the desktop type, this inkjet printing device includes a device capable of printing images on a wide recording medium such as A0 and a continuous printer capable of using continuous paper rolled up in a roll-like form as a recording medium.

Figure 2:
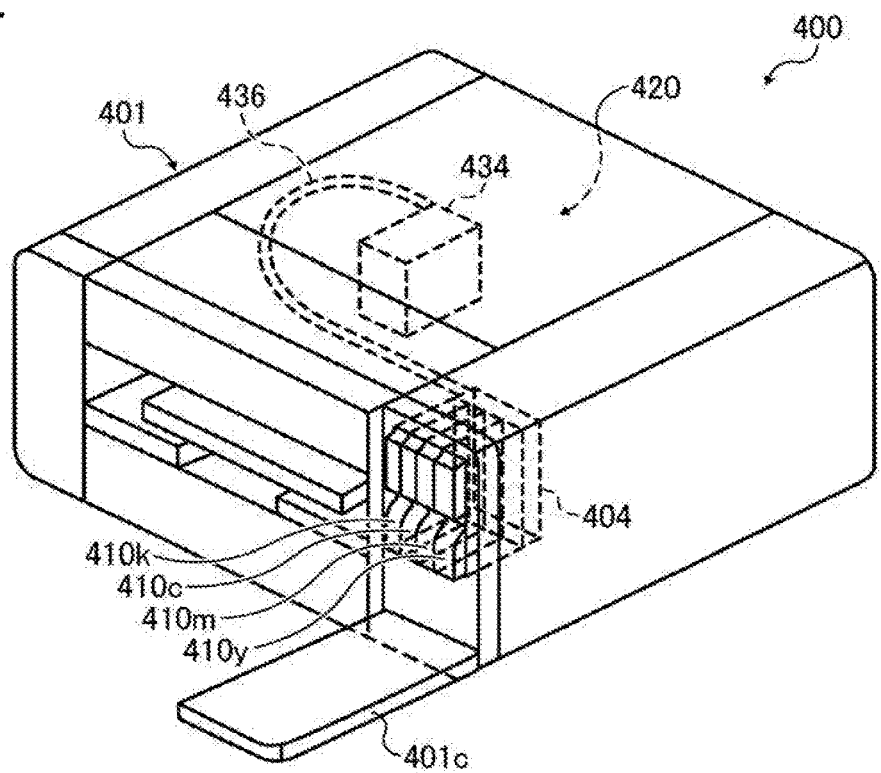
FIG. 2 is a schematic diagram illustrating an example of an image forming device executing the image forming method (inkjet printing method) according to an embodiment of the present disclosure.
Figure 3:
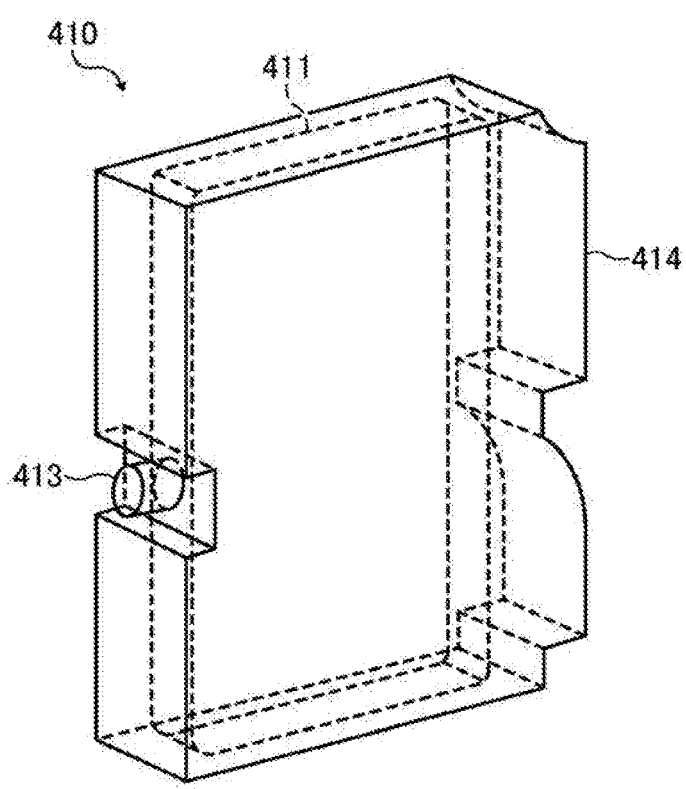
FIG. 3 is a diagram illustrating a perspective view of an example of the main tank of the image forming device illustrated in FIG. 2.

The inkjet printing device is described using an example with reference to FIG. 2 and FIG. 3. FIG. 2 is a diagram illustrating a perspective view of the inkjet printing device. FIG. 3 is a diagram illustrating a perspective view of the main tank. An image forming device 400, as an example of the inkjet printing device, is of a serial type. A mechanical assembly 420 is disposed in an exterior 401 of the image forming device 400. Each ink accommodating unit 411 of each main tank 410 (410k, 410c, 410m, and 410y) for each color of black (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This inkjet printing device may include not only a portion to discharge ink but also a device referred to as a pre-processing device, a post-processing device, etc.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

The usage of the ink in the ink and cleaning liquid set of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid fabrication object or solid freeform fabrication object) as a material for 3D modeling.

Any known device can be used as the solid freeform fabrication device to fabricate a solid fabrication object with no particular limit. For example, the device is formed of a container, a supplying device, and a discharging device, a drier, etc. of ink. The solid fabrication object includes an object manufactured by repeated ink coating. In addition, the solid fabrication object includes a mold-processed product manufactured by processing a structure having a substrate such as a recording medium to which the ink is applied. The mold-processed product is manufactured from recorded matter or a structure having a sheet-like form, film-like form, etc., by, for example, heating drawing or punching. The mold-processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1

Preparation of Pigment Dispersion

After through replacement with nitrogen gas in a 1 L flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were admixed in the flask and heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18.0 g of methyl ethyl ketone was dripped into the flask in two and a half hours. Subsequently, a liquid mixture of 0.8 g of azobismethyl valeronitrile and 18 g of methyl ethyl ketone was dripped into the flask in half an hour. After one-hour aging at 65 degrees C., 0.8 g of azobismethyl valeronitrile was added followed by aging for another hour. After the reaction was complete, 364 g of methyl ethyl ketone was added to the flask to obtain 800 g of a polymer solution A having a concentration of 50 percent by mass.

Next, 28 g of the thus-obtained polymer solution A, 42 g of C.I. Carbon Black (FW 100, manufactured by Degussa AG), 13.6 g of 1 mol/L aqueous solution of potassium hydroxide, 20 g of methyl ethyl ketone, and 13.6 g of deionized water were sufficiently stirred followed by kneading using a roll mill.

The thus-obtained paste was placed in 200 g of pure water followed by sufficient stirring. Methyl ethyl ketone and water were distilled away using an evaporator and coarse particles were removed by filtrating the thus-obtained liquid dispersion with a polyvinylidene fluoride membrane filter having an average hole diameter of 5.0 μm under pressure to obtain a carbon black pigment containing polymer particulate liquid dispersion containing a solid pigment portion in an amount of 15 percent by mass with a solid portion concentration of 20 percent by mass.

The volume average particle diameter of the polymer particulates in the liquid dispersion of polymer particulate containing carbon black pigment was 104 nm as measured by particle size distribution measuring instrument (NANO-TRAC UPA-EX150, manufactured by NIKKISO CO., LTD.)

Manufacturing Examples 1 to 6 of Ink

Preparation of Inks 1 to 6

In a container equipped with a stirrer, 1,3-butanediol, 1,2-propanediol, and surfactant A (Unidyne DSN-403, manufactured by Daikin Industries, Ltd.) were charged in the amounts shown in Table 1 and stirred for 30 minutes for homogenization.

Next, the pigment dispersion of Preparation Example 1 in an amount of the pigment solid content shown in Table 1 and highly pure water were added followed by stirring for about 60 minutes for homogenization. Further, the amount of the solid resin shown in Table 1 was added followed by stirring for 30 minutes to obtain a homogeneous ink.

Thereafter, the thus-obtained ink was filtrated with a polyvinylidene fluoride membrane filter having an average pore diameter of 1.2 μm under pressure to remove coarse particles and dust and prepare inks 1 to 6.

Next, "Tg of dry ink in a dried form" of the obtained ink was measured as follows. The results are shown in Table 1.

Glass Transition Temperature (Tg) of Ink in Dried Form 5 g of the ink was dripped onto a Teflon® petri dish having a diameter of 4 cm and dried at 50 degrees C. for 72 hours to obtain a dried solid ink.

The thus-obtained dried solid ink was measured using a differential scanning calorimeter (Thermo plus EVO2 DSC8231, manufactured by Rigaku Corporation) to calculate the glass transition temperature (Tg).

TABLE 1

| | | | Ink 1 | Ink 2 | Ink 3 | Ink 4 | Ink 5 | Ink 6 |
|---|---|---|---|---|---|---|---|---|
| Ink prescription (percent by mass) | | Pigment Dispersion (Preparation Example 1) | 5 | 5 | 5 | 5 | 5 | 5 |
| | Resin | Urethane resin 1 | — | — | — | 6 | 7 | — |
| | | Acrylic resin 1 | 7 | — | — | — | — | — |
| | | Acrylic resin 2 | — | 8 | — | 2 | — | — |
| | | Acrylic resin 3 | — | — | 7 | — | — | — |
| | | Acrylic resin 4 | — | — | — | — | — | 7 |

TABLE 1-continued

|  |  | Ink 1 | Ink 2 | Ink 3 | Ink 4 | Ink 5 | Ink 6 |
|---|---|---|---|---|---|---|---|
| Organic solvent | 1,3-butanediol | 18 | 14 | 16 | 18 | 15 | 18 |
|  | 1,2-propanediol | 16 | 14 | 16 | 12 | 15 | 16 |
| Surfactant | Surfactant A | 1 | 1 | 1 | 1 | 1 | 1 |
| Water | Highly pure water | Balance | Balance | Balance | Balance | Balance | Balance |
|  | Total (Percent by mass) | 100 | 100 | 100 | 100 | 100 | 100 |
| Properties | Tg (degrees C.) in dried form | 45 | 67 | 80 | 52 | 34 | 93 |

* The mixing amounts (percent by mass) of the pigment dispersion and the resin in Table 1 are represented by solid content.

The details of each component in Table 1 are as follows:

Resin

Urethane resin 1: Superflex 150 (manufactured by DKS Co. Ltd.), glass transition temperature (Tg)=40 degrees C.

Acrylic resin 1: Movinyl 6899D (manufactured by Japan Synthetic Chemical Co., Ltd.), glass transition temperature (Tg)=49 degrees C.

Acrylic resin 2: Movinyl 6969D (manufactured by Japan Synthetic Chemical Co., Ltd.), glass transition temperature (Tg)=71 degrees C.

Acrylic resin 3: Acrit 3MF-320 (manufactured by TAISEI FINE CHEMICAL CO LTD.), glass transition temperature (Tg)=85 degrees C.

Acrylic resin 4: Movinyl 972 (manufactured by The Nippon Synthetic Chemical Industry Co., Ltd.), glass transition temperature (Tg)=101 degrees C.

The glass transition temperature of each of the above resins was measured in the same manner as the glass transition temperature (Tg) of the ink in a dried form.

Organic Solvent 1,3-butane diol, manufactured by Tokyo Chemical Industry Co. Ltd.

1,2-propane diol, manufactured by Tokyo Chemical Industry Co. Ltd.

Surfactant

Surfactant A: Unidyne DSN-403 (manufactured by DAIKIN INDUSTRIES, LTD.)

Manufacturing Examples 1 to 4 of Cleaning Liquid

Preparation of Cleaning Liquid 1 to 4

In a container equipped with a stirrer, 3-methyl-1,3-butanediol, N, N-dimethylformamide, diethylene glycol diethyl ether, and surfactant B (Zonyl FSO-100, manufactured by E.I. du Pont de Nemours and Company) were placed in amounts shown in Table 2 and stirred for 30 minutes for homogenization.

Next, the remaining amount of highly pure water was added so as to be 100 percent by mass in total and the mixture was stirred for 60 minutes and homogenized to obtain cleaning liquids 1 to 4.

The details of each component in Table 2 are as follows:

3-methyl-1,3-butanediol (HSP $\delta H$: 8.19 $(cal/cm^3)^{1/2}$), manufactured by Tokyo Chemical Industry Co., Ltd.)

N, N-dimethylformamide (HSP $\delta H$: 5.51 $(cal/cm^3)^{1/2}$), manufactured by Tokyo Chemical Industry Co., Ltd.)

Diethylene glycol diethyl ether (HSP $\delta H$: 2.73 $(cal/cm^3)^{1/2}$), manufactured by Tokyo Chemical Industry Co., Ltd.)

The hydrogen bonding term of the Hansen solubility parameter of the organic solvent was determined from the chemical structure (main chain, functional group) using the modified SMILES notation and the HSP prediction tool in HSPiP. In the present disclosure, these values were used for solvents (refer to various HSP documents) registered in the database of HSPiP version 3.0.38 and the values anticipated by the HSPiP are used for solvents not registered in the database.

Surfactant B: Zonyl FSO-100 (manufactured by E.I. du Pont de Nemours and Company)

Examples 1 to 5 and Comparative Examples 1 to 3

Next, as shown in Table 3 and Table 4 below, the inks and the cleaning liquids were combined to form sets of the ink and the cleaning liquid of Examples 1 to 5 and Comparative Examples 1 to 3.

Next, using the ink and cleaning liquid sets of Examples 1 to 5 and Comparative Examples 1 to 3, various properties were evaluated as follows. The results are shown in Tables 3 and 4.

Swelling Ratio 5 g of ink was dripped onto a Teflon® petri dish having a diameter of 4 cm and dried at 50 degrees C. for 72 hours to obtain a dried solid matter of ink film.

The thus-obtained dried solid matter of the ink film was cut into 1 cm square to measure the mass. The cut ink film was immersed in a sufficient amount of the cleaning liquid, allowed to rest at normal temperature (25 degrees C.) for three minutes, taken out from the cleaning liquid, and wiped by KimWipes (manufactured by NIPPON PAPER CRECIA Co., LTD.) to a degree that the cleaning liquid adhering to

TABLE 2

|  | HSP $\delta H$ | Cleaning liquid 1 | Cleaning liquid 2 | Cleaning liquid 3 | Cleaning liquid 4 |
|---|---|---|---|---|---|
| 3-methyl-1,3-butane diol | 8.19 | 30 | 10 | 5 | 20 |
| N,N-dimethylformamide | 5.51 | 10 | 10 | 5 | 20 |
| Diethylene glycol diethylether | 2.73 | 15 | 20 | 35 | 5 |
| Surfactant B | — | 1 | 1 | 1 | 1 |
| Highly pure water | — | Balance | Balance | Balance | Balance |
| Total (Percent by mass) |  | 100 | 100 | 100 | 100 | the surface was not visible. Thereafter, the mass of the cut ink film was measured to calculate the swelling ratio according to Relationship 1 below.

$$\text{Swelling ratio (percent)} = 100 \times [(B-A)/A] \quad \text{Relationship 1}$$

In Relationship 1, A represents the mass of the ink film before the immersion and B represents the mass of the ink film after the immersion.

Cleanability

A SUS316 plate (3 cm×4 cm) was immersed in the ink in each ink and cleaning liquid set for 60 minutes. Thereafter, the SUS 316 plate was allowed to rest and dry in atmosphere at the room temperature (25 degrees) under a pressure of 0.1 MPa for two hours. As a result, the SUS 316 plate to which dried ink firmly was adhering was obtained.

30 mL of the cleaning liquid in each ink and cleaning liquid set was repeatedly poured for three minutes to the thus-obtained SUS316 plate to which the dried ink was attached. After repeating pouring, the SUS 316 plate was visually observed to evaluate cleanability based on the following evaluation criteria.

Evaluation Criteria

S: Dried ink firmly adhering to the plate not visible at all in the initial pouring (within one minute)

A: After the pouring, dried ink firmly adhering to the plate not visible at all

B: Dried ink firmly adhering to the plate slightly observed after the pouring

C: Dried ink firmly adhering to the plate visible unchanged by pouring

Discharging Stability

Using an inkjet printer (IPSiO GXe 3300, manufactured by Ricoh Co., Ltd.), the ink in each ink and cleaning liquid set was continuously discharged for 45 minutes and thereafter the surface of the recording head was dried for 30 minutes after discharging was ceased. Thereafter, 3 mL of the cleaning liquid was applied to the nozzle surface of the recording head using a dropper. Subsequently, the nozzle surface was wiped, and the ink was discharged again to evaluate discharging stability based on the following evaluation criteria.

Evaluation Criteria

S: Discharging disturbance and non-discharging not occurred at all

A: Discharging disturbance and non-discharging occurred at 5 or less nozzles

C: Discharging disturbance and non-discharging occurred at more than 5 nozzles

Blocking Resistance

Blocking resistance was evaluated according to TAPPI T477 test, issued by Japan Technical Association of the Pulp and Paper Industry.

A solid image of 6 cm square was printed on gloss paper (LumiArtGross, basic weight 90 g/m², manufactured by Store Enso) for printing with the ink in each ink and cleaning liquid set in an ink attachment amount of 10,000 mg/m² using an inkjet printer (IPSiO GX e3300, manufactured by Ricoh Co., Ltd.). Thereafter, gloss paper for printing with no image on the print surface thereof was attached to the printing surface of the solid image, which was sandwiched by two glass plates each having a size of 10 cm square. Under a load of 1 kg/m², this was left undone for 24 hours at 40 degrees C. and 90 percent RH. Thereafter, it was left undone for two more hours at room temperature (25 degrees C.). The adhesion degree of the two sheets of gloss paper when they were peeled off was observed to evaluate blocking resistance according to the following evaluation criteria.

Evaluation Criteria

S: No blocking (surface of sample free of scratch or scar and no adhesion or sticking to the adjacent surface observed)

A: No blocking (surface of sample free of scratch or scar and slight adhesion or sticking to the adjacent surface observed)

B: Slight blocking occurred (slight sticking and slight scar on the surface of sample).

C: Significant blocking occurred (Sticking or adhesion to adjacent surface and scar observed on the surface of sample)

TABLE 3

|  |  | EXAMPLE 1 | EXAMPLE 2 | EXAMPLE 3 | EXAMPLE 4 | EXAMPLE 5 |
|---|---|---|---|---|---|---|
|  | Ink No. | 1 | 2 | 3 | 4 | 1 |
|  | Cleaning liquid No. | 1 | 2 | 3 | 3 | 4 |
| Properties | Tg (degrees C.) of ink in dried form | 45 | 67 | 80 | 52 | 45 |
|  | Tg of resin in ink (degrees C.) | 49 | 71 | 85 | 48 | 49 |
|  | Swelling ratio (percent) | 18 | 15 | 14 | 18 | 13 |
|  | Cleaning power | S | S | S | S | A |
| Evaluation result | Discharging stability | S | A | S | A | A |
|  | Blocking resistance | S | S | S | A | S |

TABLE 4

|  |  | Comparative Example 1 | Comparative Example 2 | Comparative Example 3 |
|---|---|---|---|---|
|  | Ink No. | 3 | 5 | 6 |
|  | Cleaning liquid No. | 1 | 1 | 3 |
| Properties | Tg (degrees C.) of ink in dried form | 80 | 34 | 93 |
|  | Tg of resin in ink (degrees C.) | 85 | 40 | 101 |
|  | Swelling ratio (percent) | 5 | 16 | 7 |
| Evaluation result | Cleaning power | C | A | C |
|  | Discharging stability | C | A | C |
|  | Blocking resistance | S | C | A |

Aspects of the present disclosure are, for example, as follows.

1. An ink and cleaning liquid set contains an ink containing a coloring material and a resin and a cleaning liquid containing water and an organic solvent, wherein the ink in a dried form has a glass transition temperature of from 40 to 90 degrees C. and the swelling ratio calculated from the mass of a film of the ink in a dried form before and after immersion in the cleaning liquid is 10 percent or greater according to the following relationship 1:

$$\text{Swelling ratio (percent): } 100\times[(B-A)/A] \qquad \text{Relationship 1.}$$

In Relationship 1, A represents the mass of the ink film before the immersion and B represents the mass of the ink film after the immersion.

2. The ink and cleaning liquid set according to 1 mentioned above, wherein the swelling ratio is 14 percent or greater.

3. The ink and cleaning liquid set according to 1 or 2 mentioned above, wherein the resin has a glass transition temperature of 60 degrees C. or higher.

4. The ink and cleaning liquid set according to any one of 1 to 3 mentioned above, wherein the resin includes at least one of an acrylic resin and a urethane resin.

5. The ink and cleaning liquid set according to any one of 1 to 4 mentioned above, wherein the resin accounts for 1 to 30 percent by mass of the ink.

6. The ink and cleaning liquid set according to any one of 1 to 5 mentioned above, wherein the resin contains an acrylic resin and the acrylic resin accounts for 3 percent by mass or more of the ink.

7. The ink and cleaning liquid set according to any one of 1 to 6 mentioned above, wherein the ink contains an organic solvent.

8. The ink and cleaning liquid set according to any one of 1 to 7 mentioned above, wherein the ink contains a fluorochemical surfactant.

9. The ink and cleaning liquid set according to any of 1 to 8 mentioned above, wherein an organic solvent having a hydrogen bond term of 4.5 or less of Hansen solubility parameter (HSP) accounts for 10 percent by mass or more of the organic solvent in the cleaning liquid.

10. The ink and cleaning liquid set according to any of 1 to 9 mentioned above, wherein the organic solvent in the cleaning liquid contains at least one member selected from the group consisting of 3-methyl-1,3-butanediol, N, N-dimethylformamide, and diethyl ene glycol diethyl ether.

11. The ink and cleaning liquid set according to any of 1 to 10 mentioned above, wherein the cleaning liquid further contains a fluorochemical surfactant.

12. An inkjet printing device includes the ink and cleaning liquid set of any one of 1 to 11 mentioned above, an ink flow path, a recording head configured to discharge the ink and the cleaning liquid to recording medium, and a cleaning device configured to clean the ink flow path and/or the recording head with the cleaning liquid to remove the ink remaining therein.

13. An inkjet printing method includes discharging the ink in the ink and cleaning liquid set of any one of 1 to 11 mentioned above to print on a recording medium and removing the ink remaining on an ink flow path and/or a recording head with the cleaning liquid in the ink and cleaning liquid set.

14. A method of cleaning a nozzle surface of an ink discharging head includes applying the cleaning liquid in the ink and cleaning liquid set of any one of 1 to 11 mentioned above to a wiping member and wiping the nozzle surface with the wiping member to which the cleaning liquid has been applied.

15. A method of cleaning a nozzle surface of an ink discharging head includes applying the cleaning liquid in the ink and cleaning liquid set of any one of 1 to 11 mentioned above to the nozzle surface of an ink discharging head and wiping the nozzle surface to which the cleaning liquid has been applied with a wiping member.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink and cleaning liquid set comprising:
   an ink comprising a coloring material and a resin; and
   a cleaning liquid comprising water and at least one type of organic solvent,
   wherein the ink in a dried form has a glass transition temperature of from 40 to 90 degrees C.,
   wherein a swelling ratio calculated from a mass of a film of the ink in a dried form before and after immersion in the cleaning liquid at 25 degrees C. for three minutes is 10 percent or greater according to the following relationship 1:

$$\text{swelling ratio (percent)}=100\times[(B-A)/A] \qquad \text{Relationship 1}$$

where A represents the mass of the film before the immersion and B represents the mass of the film after the immersion.

2. The ink and cleaning liquid set according to claim 1, wherein the swelling ratio is 14 percent or greater.

3. The ink and cleaning liquid set according to claim 1, wherein the resin has a glass transition temperature of 60 degrees C. or higher.

4. The ink and cleaning liquid set according to claim 1, wherein the at least one type of organic solvent comprises an organic solvent having a hydrogen bond term of 4.5 or less of Hansen solubility parameter (HSP) accounting for 10 percent by mass or more of the at least one type of organic solvent in the cleaning liquid.

5. The ink and cleaning liquid set according to claim 4, wherein the at least one type of organic solvent further comprises a second organic solvent having a hydrogen bond term of from 5.0 to 6.8 of Hansen solubility parameter (HSP).

6. The ink and cleaning liquid set according to claim 1, wherein the resin comprises an acrylic resin and the acrylic resin accounts for 3 percent by mass or more of the ink.

7. An inkjet printing device comprising:
   the ink and cleaning liquid set of claim 1;
   an ink flow path;
   a recording head configured to discharge the ink in the ink and cleaning liquid set to a recording medium; and
   a cleaning device configured to remove the ink remaining on the ink flow path or the recording head with the cleaning liquid in the ink and cleaning liquid set.

8. An inkjet printing method comprising:
- discharging the ink in the ink and cleaning liquid set of claim 1 to print on a recording medium; and
- removing the ink remaining on an ink flow path or a recording head with the cleaning liquid in the ink and cleaning liquid set.

9. A method of cleaning a nozzle surface of an ink discharging head, comprising:
- applying the cleaning liquid in the ink and cleaning liquid set of claim 1 to a wiping member; and
- wiping the nozzle surface with the wiping member to which the cleaning liquid has been applied.

10. A method of cleaning a nozzle surface of an ink discharging head comprising:
- applying the cleaning liquid in the ink and cleaning liquid set of claim 1 to the nozzle surface of an ink discharging head; and
- wiping the nozzle surface to which the cleaning liquid has been applied with a wiping member.

* * * * *